(12) United States Patent
Meyerson

(10) Patent No.: US 6,941,356 B2
(45) Date of Patent: Sep. 6, 2005

(54) AUTOMATED CONFIGURATION ENABLED VIA INTERROGATION OVER NETWORK

(75) Inventor: Matthew Scott Meyerson, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 09/896,747

(22) Filed: Jun. 29, 2001

(65) Prior Publication Data

US 2003/0018805 A1 Jan. 23, 2003

(51) Int. Cl.$^7$ ............................................. G06F 15/177
(52) U.S. Cl. ..................... 709/220; 709/221; 709/232; 709/233; 715/700; 715/740; 370/254
(58) Field of Search ................................ 709/220–221, 709/217–219, 232–233; 715/700, 740; 370/254; 710/8–11

(56) References Cited

U.S. PATENT DOCUMENTS

| | | | |
|---|---|---|---|
| 5,551,066 A | | 8/1996 | Stillman et al. |
| 5,574,722 A | | 11/1996 | Slykhouse et al. |
| 5,729,756 A | | 3/1998 | Hayashi |
| 5,751,967 A | | 5/1998 | Raab et al. |
| 5,999,979 A | * | 12/1999 | Vellanki et al. ............. 709/232 |
| 6,078,741 A | | 6/2000 | Ma et al. |
| 6,678,750 B2 | * | 1/2004 | Meade et al. ................. 710/7 |
| 6,725,051 B2 | * | 4/2004 | Fidler ...................... 455/456.1 |
| 6,745,253 B2 | * | 6/2004 | Struble ....................... 710/10 |
| 6,801,507 B1 | * | 10/2004 | Humpleman et al. ....... 370/257 |

\* cited by examiner

*Primary Examiner*—Dung O. Dinh
*Assistant Examiner*—Kevin Parton
(74) *Attorney, Agent, or Firm*—McGinn & Gibb, PLLC; Jay H. Anderson, Esq.

(57) ABSTRACT

A method and structure for a primary device adapted to communicate with secondary devices. The primary device has a central processing unit, a transceiver connected to the central processing unit which is adapted to transmit signals to and from the secondary devices and a user interface. The central processing unit automatically establishes communications with the secondary devices through the transceiver by sequentially (or in parallel) attempting communication with the secondary devices using a plurality of known communication protocols until communications are established, and the central processing unit changes the user interface depending upon which secondary devices are in communication with the primary device.

3 Claims, 2 Drawing Sheets

AUTOMATED CONFIGURATION ENABLED VIA INTERROGATION OVER NETWORK

BACKGROUND OF THE INVENTION

1. Field of the Invention

The present invention generally relates to the configuration of a computing device and more particularly to the automatic configuration of devices based on the environment to which the devices are connected or in which the devices are placed.

2. Description of the Related Art

One of the primary benefits produced by standards organizations is the ability for different devices to work together according to an established standard. For example, conventional personal computers can communicate with many different brands and types of printers, so long as the personal computer and printer are designed using a common standard and the drivers for the printer are contained within the personal computer. However, one of the drawbacks associated with the interchangeability of peripheral devices is that the primary device must be manually configured to operate with each of the different peripheral devices that are connected at a given point in time.

Some advances have been made toward automatic configuration of the primary device. For example, devices compliant with the "Plug-and-play" standard can work with the Windows 95 operating system (available from Microsoft Corp., Redmond Wash., U.S.A.) without the need to be manually configured by the user. Instead, at start up or connection of a device, the operating system recognizes the devices that are attached to the personal computer and, if the drivers for the devices have not been installed, the system automatically attempts to install the drivers to allow the personal computer to communicate with that type and model peripheral device.

However, such automated configuration is limited to the installation of the appropriate drivers and software to merely permit use of the connected device. There is a need for a system that will automatically configure the primary device to alter its system configuration and/or its associated user interface depending upon the environment in which the primary device finds itself located or connected to. The invention described below satisfies such a need and provides a device that automatically configures itself and its user interface depending on the specific peripheral or peer devices in which the primary device finds itself directly or indirectly connected to.

SUMMARY OF THE INVENTION

The invention works by a primary device actively looking for secondary devices with which to interface. The method of communication (wired network, wireless network, communications port, etc.) is not relevant, the goal is simply to find these secondary devices and information about them using any medium available. The search for secondary devices could be broad (e.g., search for any device) or narrow (e.g., search for specific devices or types of devices).

The invention identifies the secondary devices detected based on the data the secondary devices return, possibly in combination with known data. For example, a television might identify itself as Sony, model #xyz, id#123 and there could be known data which specifies that TV #123 is located in the entertainment room. In another example, the detection of a secondary device could be an IP address of 9.50.8.254 that is one network hop away. There could also be known data which specifies that 9.50.8.254 is the network gateway for IBM Building 320 in Fishkill.

The invention can derive the location of the primary device based on the information about the secondary devices obtained in the process described in the previous paragraph, possibly in combination with known data. Using the examples above, the presence of TV #123 indicating as being in the entertainment room (based on known data that TV #123 is not accessible from other rooms) and the presence of a secondary device one network hop away with an IP address of 9.50.8.254 indicating as being attached to IBM's local area network in Fishkill Building 320 and another secondary device more than one network hop away at IP address 9.50.8.254 would indicate being attached to IBM's computer network somewhere other than Fishkill Building 320.

The invention can reconfigure itself based on the information obtained in the steps described in the previous paragraphs. The reconfiguration process can be a simple selection of a predefined configuration based on the presence of a specific device, e.g., gateway 9.50.8.254 or in the alternative, the process can be as complex as following an algorithm or using artificial intelligence to automatically determine the new configuration based on the combination of secondary devices detected without the need to have any predefined configurations to select from. The more information that is available or derivable about the secondary devices and environment detected, the more flexible/powerful the reconfiguration process can be. The invention can support user specified device detection and reconfiguration procedures (not just preprogrammed procedures that are delivered with the primary device).

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

The invention solves the problem of needing to manually configure a primary device based on the environment that the primary device is physically or logically located. One advantage provided by the invention is the ability for a primary device to reconfigure itself without user intervention each time the device is moved to a new environment or each time the environment changes. Reconfiguration allows expanded flexibility of a primary device by adapting it to the environment it is currently in or to changes in that environment. Reconfiguration also facilitates ease of use as the user interface can be adapted to only include information relevant to the current environment. This reconfiguration process could range from being completely automatic to something simpler like the selection of a predefined configuration based on the detected environment.

Figure 1:
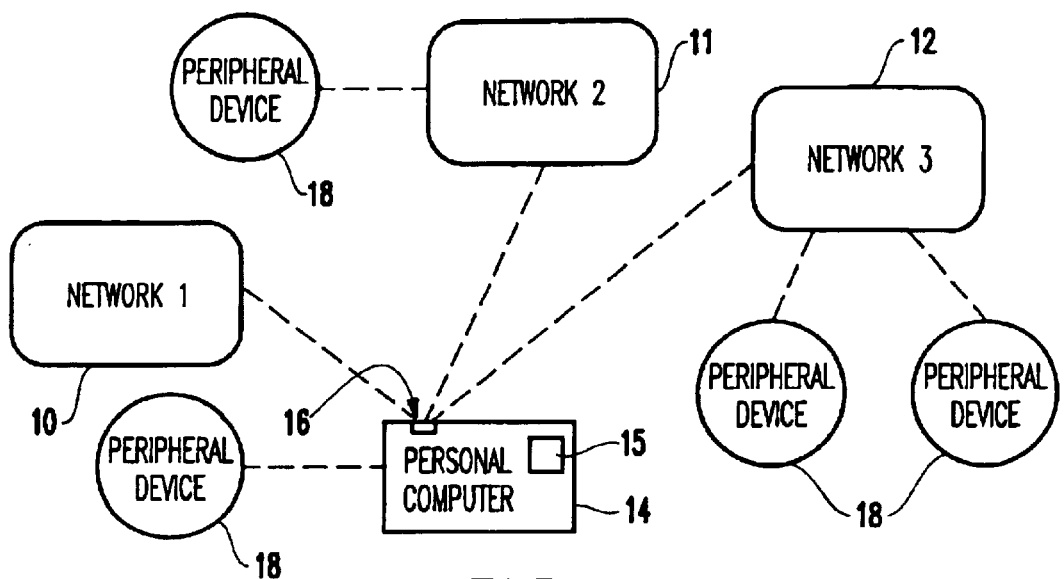
FIG. 1 is a schematic diagram of a personal computer selectively connected to one or more different networks.
Figure 2:
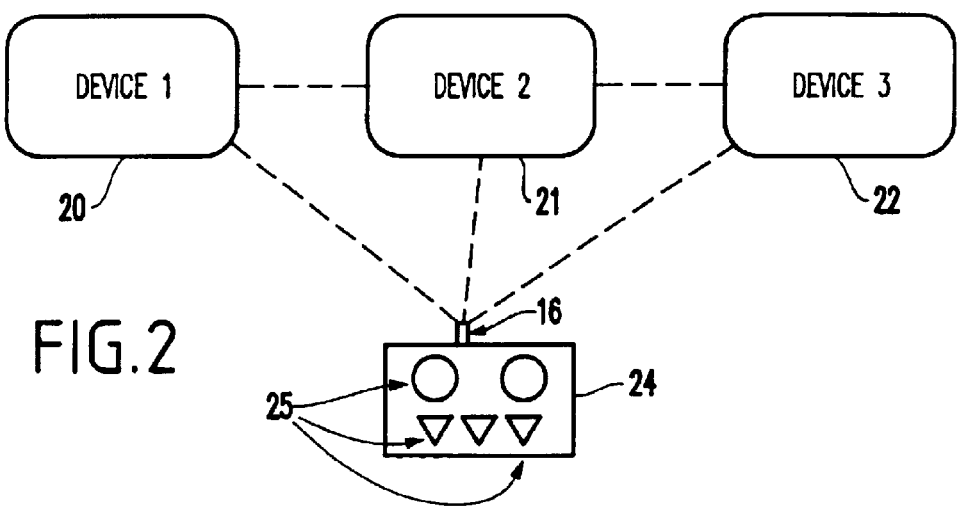
FIG. 2 is a schematic diagram of a touch screen device in communication with other devices.
Figure 3:
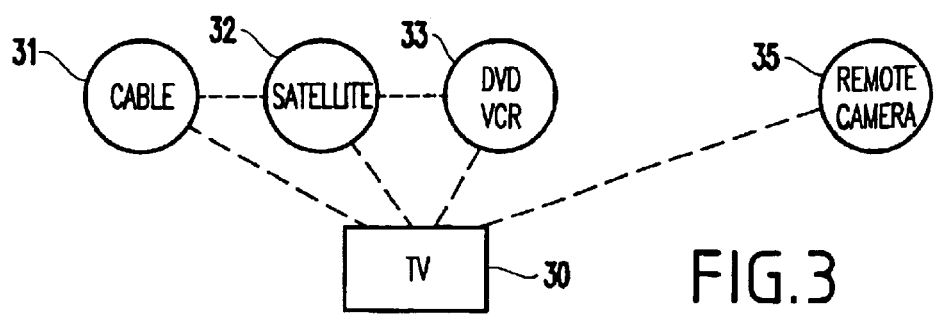
FIG. 3 is a flow diagram illustrating a TV that is connected to several sources of input.

Some examples of automated configuration via the invention are shown in FIGS. 1–3. It is important to note that the following are mere examples and the invention is not limited to these examples. Instead, the invention is broadly applicable to all computerized and electronic devices (including devices with computerized or electronic components) that need to be configured to work with secondary devices. Therefore, while the invention is discussed with respect to a personal computer, personal digital assistant (PDA), remote control, etc., the invention is not limited to these specific embodiments but instead is applicable to all primary devices that deal with or coexist with secondary devices.

In FIG. 1, a computer 14 (the primary device) changes its configuration (which may include its user interface) based on the network to which it is connected to; e.g., configuration A when connected to Network 1 (e.g., a local area network (LAN) 10 vs. configuration B when connected to Network 2 (e.g., a wide area network (WAN) 11 vs. configuration C when connected to Network 3 (e.g., a public network such as the Internet) 12 vs. configuration D when connected to Networks 1 and 3 vs. configuration E when not network connected. The attributes of each configuration can vary; e.g., what network settings to establish, which programs to start, the typesetting of the user interface, etc. The result of using the invention is that an optimal configuration can be derived and then implemented to exploit the secondary devices, simplify/optimize the interface to use those devices, and/or support the preferences and habits of the user when operating in the detected environment.

More specifically, the personal computer 14 includes an interface 16, which can connect to any of the networks 10–12 and a user interface (UI) 15. The connections, shown by dashed lines between the personal computer 14 and the networks 10–12, can be wireless or wired connections. The interface 16 can be a transceiver antenna for wireless connections or a physical connector appropriate to the physical wiring connector of the different networks 10–12. In addition, while not shown, the personal computer 14 can include multiple interfaces 16, that are the same or different, that allow the personal computer 14 to easily connect to each of the different networks 10–12. The standards used to connect and communicate with the aforementioned networks may vary and these may be existing or future standards. The personal computer 14 may be connected to one or more peripheral devices 18 (such as a printer, scanner, storage device, etc.) In addition, the different networks 10–12 may also have connections to different peripheral devices 18.

The invention automatically configures the personal computer 14 differently depending upon the overall environment it finds itself It determines the environment based on which network it is currently connected to and/or upon which peripheral devices 18 are currently available (directly or through the network.) This configuration can include altering the user interface 15 to show or hide different application choices, network choices and peripheral choices.

Thus, for example, if network 1 (10) were a local area network within a small corporation that primarily process documents, the user interface 15 of the personal computer 14 could be modified by the invention to easily make the groups of documents from a file server attached to network 1 easily available (e.g. by automatically opening one or more folders containing such documents or by placing an icon of such folders in the user interface). Alternatively, if the personal computer 14 were connected to a public network, such as the Internet (network 3 (12) in this example), the user interface 15 could automatically be enhanced by opening a web browsing window or alternatively/additionally the configuration could be altered to tunnel through the public network to get to a private network. In addition, the user interface could be modified to show the availability of the peripheral devices 18 connected to network 3. A third alternative, if the personal computer 14 were connected to both of the networks in the preceding examples could result in all of the configuration changes described above taking place (or perhaps only a subset of such if that is desired).

The preceding examples are only examples of how the invention can determine what environment the personal computer is in and what configuration and user interface changes should be made. More generally, the invention configures how the computer operates when attached to particular devices (such as networks or peripherals), in addition the invention can also modify the user interface in a matter that is most appropriate for the given environment and taking into account the preferences of the user.

Another example of the application of the invention to a personal computer would be to change the user interface 15 of the personal computer 14 depending upon the location or type of location in which the personal computer 14 is located. The invention determines the location or "type" of location depending upon the devices that are connected to the personal computer 14. In a simplified example, if the personal computer is connected to a printer located in an office the invention would display work related items on the user interface. Such work related items could include, word-processing applications, presentation applications, research applications, etc. To the contrary, if the personal computer 14 were connected to a printer located within a home, then personal home-related items would be displayed on the user interface 15. Such home-related items could include personal calendar applications, home-planning applications (cooking, gardening, etc.), personal address books, etc.

More specifically, the invention interrogates each peripheral for specific information and makes the desired configuration changes based on this information. This information could be general information such as a printer type, make and model number. Or this information could be more specific such as the serial number or other unique identifying information provided by each peripheral 18. In the preceding example, the invention may determine that a printer is a home printer because it is of a particular type (e.g. ink jet), make (Lexmark) or model (3200). Alternatively, the invention may make this determination because of the printer's serial number (assuming that the printer provides that information). There are advantages and disadvantages of using general vs. specific information, so the invention can work with either.

An advanced implementation of the invention for the preceding embodiment would apply artificial intelligence to take note of configuration changes that the user manually makes when in particular environments and then automatically make such changes in the future when those environments are detected again. Alternatively artificial intelligence could be applied to make configuration decisions based on the environment detected without requiring any prior user input.

A simpler implementation of the invention for the preceding embodiment would entail the predefinition of specific environments that may be encountered, how to recognize them, what configuration changes to make when the environment is encountered, and the flow in which to check for the environment. The following concrete example of such an implementation demonstrates some of the capabilities of the invention. This example is a batch file that is run automatically when Windows 95 is booted up on a personal computer. The purpose of the batch file is to determine which network the computer is connected to and based on that determination (1) configure the computer to access both an internal network (e.g., the IBM internal network) and the public Internet and (2) start a set of programs commonly used when connected to the particular network that is detected. Following is the high level logic followed in the example.

Figure 4:
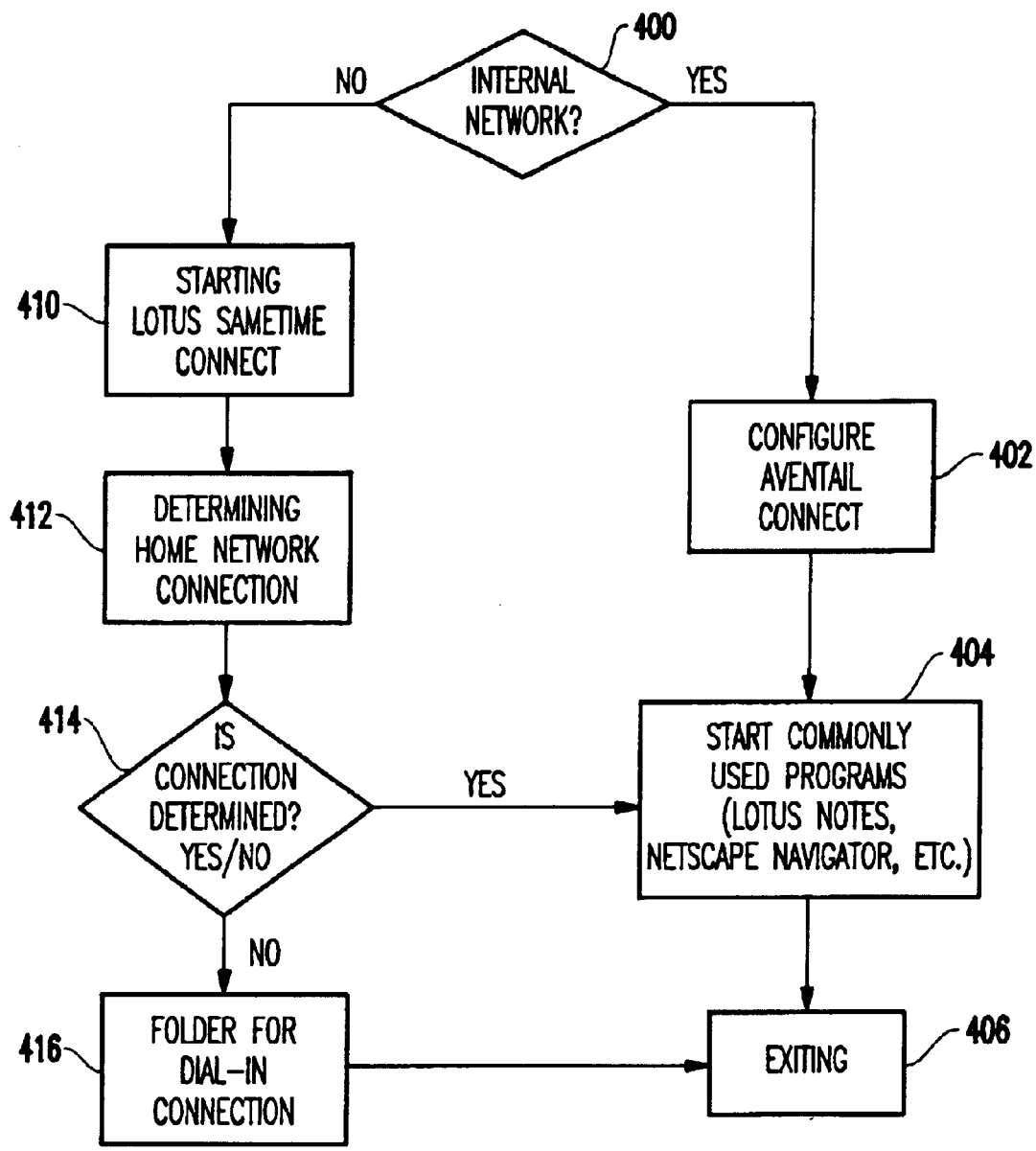
FIG. 4 is a flow diagram illustrating an embodiment of the invention.

In FIG. 4, in item 400, the invention determines if it is attached directly to the IBM internal network by searching for a known gateway inside IBM's network (e.g. at IP address 9.50.8.254). If the invention is attached to IBM's network then the method continues on with step 402, or otherwise it skips to step 410, as shown in item 400. Next, in item 402 the invention configures Aventail Connect to allow the personal computer to access the public Internet via an internal network and starts Aventail Connect running. Aventail Connect is a network connection application available from Aventail Corporation, Seattle, Wash., USA.

In item 404, the invention starts the programs commonly used (by a given individual) when attached to a network, such as Lotus Notes, Lotus Sametime Connect (available from Lotus Corp., Cambridge, Mass., USA), and Netscape Navigator (available from Netscape Corp., Sunnyvale, Calif., USA). Then, the invention proceeds to Exit in item 406. Otherwise, as mentioned above, the invention configures the computer to access IBM's internal network via the public Internet and starts Connect running as shown in item 410. Next, the invention determines if it is attached directly to a home network (which provides a gateway to the Internet) by searching for a gateway on the home network (e.g. at IP address 192.168.1.1) in item 412. If the device is attached to a home network then the invention goes back to item 404, otherwise the invention goes on to 416, as shown in item 414. In item 416, the invention displays the folder allowing the user to choose a dial-in connection to the Internet (a specific connection cannot be automatically chosen since, in this example the computer only knows that it is not network connected; it does not know where it physically is; e.g. a hotel in San Jose, an IBM guest office in Boulder, etc.).

Following is the actual, working batch file:

@echo off
echo Checking TCP/IP Connectivity
echo.
rem check for presence of IBM East Fishkill Building 320 Gateway
Ping 9.50.8.254 >c:\ping.out
Find /c "time=" c:\ping.out >nul:
if errorlevel 1 Goto NoMPN
:AtIBM
echo Attached to IBM's MPN
echo.
echo Activating OUTBOUND Configuration for Aventail Connect
copy c:\progra~1\aventail\connect\ibmout.cfg c:\progra~1\aventail\connect\myconfig.cfg
"C:\Program Files\Aventail\Connect\as32. exe"
:NetProgs
rem Start programs commonly used when attached to network
echo Autostarting Lotus Notes
"C:\Program Files\Notes\Notes. exe"
echo Autostarting Lotus Sametime Connect
"C:\Program Files\Lotus\Sametime Client\Connect.exe"
echo Autostaring Netscape
"C:\Program Files\Netscape\Communicator\Program\netscape.exe"
Goto DONE
:NOMPN
echo NOT attached to IBM's MPN
echo.
echo Activating INBOUND Configuration for Aventail Connect
copy c:\progra-1\aventail\connect\ibmin.cfg c:\progra-1\aventail\connect\myconfig.cfg
"C:\Program Files\Aventail\Connect\as32.exe"
rem start netprogs if on home LAN
Ping 192.168.1.1>c:\ping.out
Find /c "time=" c:\ping.out>nul:
if errorlevel 1 Goto DIAL
echo Attached to Home LAN
Goto NetProgs
:DIAL
rem Display the folder for Dial-up Internet Connections
Start "C:\WINDOWS\Start Menu\Programs\Networking\Dial-Up Connections"
:DONE
Del c:\ping.out
exit The preceding batch program is an example of an implementation of the invention where the creation of a program is used to facilitate the predefinition of specific environments that may be encountered, how to recognize them, what configuration changes to make when the environment is encountered, and the flow in which to check for the environment. However, another implementation of the invention could facilitate this without requiring any programming by the user. For example, the predefinition could be performed by allowing the user to type in a name of an environment. The environments could be recognized by providing predefined recognition techniques and allowing the user to specify germane details of the predefined environment, e.g. allowing recognition by a network address or type (where the user would need to specify the address or type), peripheral type, make and/or model (where the user would need to specify the peripheral type, make and/or model), etc. The configuration changes could be performed by providing predefined types of configuration changes and allowing the user to specify germane details of such configurations; e.g. opening a folder within the user interface (where the user would need to specify which folder), starting a program (where the user would need to specify which program), etc. The flow could be determined by allowing the user to define the order in which the named environments would be checked and indicating if the process should stop or continue after recognizing an environment and making the specified configuration changes.

FIG. 2 illustrates another embodiment of the invention that is a remote control 24 (the primary device) that configures itself to control or communicate with specific devices 20–22 based on their relative location to the primary device 24. The remote control device 24 can be any form of remote control device that, in a similar manner to that discussed above, can be connected to the secondary devices 20–22 through wired or wireless connections, in conjunction with a connector/antenna 16. The remote control device 24 can be a standard device with buttons 25 or can comprise any other interface. In a preferred embodiment, the remote control device 24 is a touch-screen type device that includes icons (also represented by items 25 in FIG. 2) on the touch screen.

The remote control 24 might support thousands of devices, but would only offer to control those in dose physical proximity (e.g., those in the same building, on the same floor, in the same room, in the same cubicle, etc.) To operate properly with the invention, the secondary devices 20–22 preferably include some form of transceiver that permits the devices 20–22 to be interrogated by the remote control 24. More specifically, the remote control 24 preferably determines the make, model and unique serial number for each of the secondary devices 20–22. If secondary devices 20–22 do not include any such transceiver, an inexpensive transponder (or similar device) can be attached to the secondary device. The transponder preferably includes the necessary make, model and unique identifying number. Therefore, the invention can work with practically any device so long as a transponder can be created and attached to the secondary device. It is anticipated that such transponders will be incorporated into many devices or made commercially available at very low prices in the near future.

Once in physical proximity to the device (e.g., in the same room, same building, within a preset distance, etc.), the remote control 24 interrogates each of the devices to determine the type of devices available to be controlled and also to determine whether the devices 20–22 are connected to each other (assuming the transponders in the devices also indicate said connections, e.g. a television connected to a stereo system).

Based on the secondary devices detected, the remote control 24 automatically adapts and simplifies its user interface 25 to only show optimal controls for those devices in close physical proximity. The manner in which the remote operates the devices varies based on the combination of devices detected. Alternatively, the presence of various devices may indicate that the remote control 24 is in a certain location and should take on a location-specific user interface. For example, if the remote control 24 detects a stereo, VCR, cable box, and TV the graphic user interface would take the format appropriate for an entertainment room. An entertainment room format would include channel, volume, movie playback, etc., controls. To the contrary, if the remote 24 determined that the devices 20–22 in closest proximity were a stove, microwave, dishwasher, etc., it would display a kitchen-type user interface that included oven temperature controls, dishwasher timing controls, etc. Similarly, if the remote-control 24 sensed a house thermostat, automated bathroom fixture controls, lighting fixtures, etc., the graphic user interface would be automatically modified to include controls for such items. Further, if the remote-control 24 sensed an automobile, it may include selections to remotely start the automobile, change radio presets, change seat position, climate control, etc. Additionally, if several types of unrelated devices are in proximity (e.g. an automobile, a microwave, and stove), the remote may include a selection to switch between controls for sets of these devices (e.g. the automobile in one set and the microwave and stove in another). The foregoing examples are not intended as limitations of the invention, but instead are merely exemplary illustrations of applications that would benefit from the invention. Thus the invention is not limited to the foregoing examples but is broadly applicable to any situation where a primary devices is in communication with a secondary devices for means of control or otherwise.

As explained above, the invention preferably interrogates each of the secondary devices to determine uniquely identifiable serial numbers of the devices. This permits the invention to distinguish between the same brand and model of a secondary device that is located in two different locations.

For example, this would allow the invention to distinguish a television located in the bedroom from the same brand and model television located in the family room. These different televisions would causes the remote control 24 to produce different graphic user interfaces. For example, the television in the bedroom may cause the remote control 24 to include a sleep timer control or/and alarm wake up function. The television and within the family room would cause the remote control 24 to allow more channel selections (and preferably more children's channel selections than those displayed when the remote-control 24 is in close proximity to the television in the bedroom.)

Thus, the invention adapts the user interface 25 of the remote control 24 to only show controls for closest devices (e.g., the stereo, VCR, cable converter box, and TV.) Further, the invention adapts the user interface 25 to change how these devices 20–22 should be controlled, eliminating redundant controls as appropriate; e.g., play the audio for the TV through the stereo (and only show one set of audio controls) and change the TV channels through the cable converter box (and only show one set of channel controls.) The elimination of redundant controls would be done by a combination of assumptions built into the remote control (e.g., if both a TV and a cable converter box are present, then change channels through the cable converter) as well as allowing manual predefinition (e.g., if TV serial number 123456 is present, then control the volume through stereo model and make RCA 3400).

The invention has a broad number of applications. For example, as shown in FIG. 3, the invention can be included within a television (the primary device) 30 that automatically configures itself based on the secondary devices 31–33 it is able to communicate with (e.g., antennas, cable converter boxes 31, satellite dishes 32, VCR/DVD players 33 etc.). In addition to the normal channel line-up, the TV would detect additional inputs available from the network(s) it is connected to. For example, an audio/video feed from the front door 35 and another feed from the baby's room 35 could be fed to the TV over the home network. The TV would recognize the sources of these inputs (based on identification data sent along with the audio/video input) and configure itself appropriately; e.g., include both feeds in the channel lineup, switch input to the front door feed (or activating Picture-in-Picture) when the door bell is rung, and switch input to the baby's room feed when noise over a certain volume threshold is detected (e.g., a baby is crying). Performing all of the preceding assumes that the TV can communicate with the necessary devices, that the requisite information is communicated (e.g., a door bell ring, the location of an audio/video feed, etc.), and predefined logic built into the TV to exploit the information obtained by interrogating the network of secondary devices (e.g., to automatically switch to a exterior door audio/video feed when its door bell is rung).

The invention works in a primary device and actively looks for secondary devices that it can interface with. The method of communication (wired network, wireless network, communications port, etc.) is not relevant, the goal is simply to find secondary devices and information about them using any medium available. The search for secondary devices could be broad (e.g. look for any device) or narrow (look for specific devices or types of devices.).

One advantage of the invention is that devices using it have an adapting ability to exploit unrelated secondary devices that were not even conceived of when the primary device was created (so long as the secondary device can "talk" to the primary device through primary or add-on devices, such as transponders, discussed above). Another advantage of the invention is the ability to extend the reconfiguration process, when new or updated secondary devices become available. For example, if a future standard was established for smart cards to contain personal attributes of its owner like height and weight. The primary device (e.g., a car) could calculate and accommodate the exact requirements of a user (e.g., set the position of the driver's seat based on the personal attributes contained on the smart card) eliminating the need to first establish preset preferences for each driver. Implementing this example would require the configuration process of the car to be extended (perhaps by the manufacturer or dealer when the next maintenance is performed) to exploit information communicated by a smart card. This example also illustrates another advantage provided by the invention, which is the reduction of the need for tight integration between primary and secondary devices (e.g., a car and a smart card, which are unrelated devices).

As discussed above, some computer operating systems can automatically detect devices and automatically configure the operation system to allow access to these devices. The automatic configuration that takes place is, however, limited to enabling communication to the type of device detected. For example, Microsoft's Windows 95 can automatically detect a printer. or network card, determine what brand/model it is, and install the correct driver for it. The invention goes beyond this and supports recognition of specific devices (beyond knowing and using just their brand/model) and configuration of attributes of the computer beyond establishing generic communications to the detected devices (e.g., receiving and printing the current news when a network connection and printer located in the office are detected.)

Also, conventional standards exist for automatically configuring a network card for use on a TCP/IP network; e.g. DHCP can automatically assign an IP address and gateway address. However, these standards work by defining a protocol for determining this information from servers running on the network (like a DHCP server.) The primary device is not acting on the devices it detects in the network, rather it is being told what configuration values to use by a device on the network. The invention goes beyond this by selecting a predefined network configuration based on the presence of a specified network device like a gateway, as explained above. Another example is the ability of the invention to be used to start programs like e-mail when the computer detects that it is on a particular network.

Some conventional programs have the ability to download their previously stored configuration from a network; e.g. a web browser can download it's proxy configuration from a specified central computer. However, as in the previous example, the primary device is not acting on the devices it detects in the network. Instead, it is retrieving a previously stored configuration from a secondary device and is therefore quite different from the invention.

The present invention can adapt to communicate with secondary devices and includes a central processing unit, a transceiver connected to the central processing unit which is adapted to transmit signals to and from the secondary devices, and a user interface. The central processing unit automatically or manually establishes communications with the secondary devices through the transceiver by sequentially (or in parallel) attempting communication with the secondary devices using a plurality of known communication protocols until communications are established, and the central processing unit changes the user interface depending upon which secondary devices are in communication with the primary device. In addition, the invention has a memory for storing identifying numbers of the secondary devices. These identifying numbers uniquely identify the secondary devices.

Also, the central processing unit determines the physical location of the primary device depending upon what secondary devices are connected to the primary device and upon which secondary devices are in physical proximity to the primary device. In addition, the central processing unit alters the appearance of the user interface depending upon a location of the primary device. The central processing unit changes the appearance of the user interface to specifically accommodate the location.

While the invention has been described in terms of preferred embodiments, those skilled in the art will recognize that the invention can be practiced with many alternatives, modifications and variations within the spirit and scope of the appended claims.

What is claimed is:

1. A primary device adapted to communicate with secondary devices, said primary device comprising:
   a central processing unit;
   a transceiver connected to said central processing unit and adapted to transmit signals to and from said secondary devices; and
   a user interface,
   wherein said central processing unit establishes communications with said secondary devices through said transceiver, and
   where said central processing unit changes an appearance of said user interface depending upon which secondary devices are in physical proximity to said primary device.

2. A computer adapted to communicate with a plurality of networks and peripheral devices, said computer comprising:
   a central process unit;
   an interface connected to said central processing unit and adapted to transmit signals to and from said networks and peripheral devices; and
   a user interface;
   wherein said central processing unit establishes communications with said networks and peripheral devices through said interface, and
   wherein said central processing unit changes an appearance of said user interface depending upon which networks and peripheral devices are in physical proximity to said computer.

3. A remote control device adapted to control secondary devices, said remote control device comprising:
   a central processing unit;
   a transceiver connected to said central processing unit and adapted to transmit signals to and from said secondary devices; and
   a user interface,
   wherein said central processing unit establishes communications with said secondary devices through said transceiver, and
   wherein said central processing unit changes an appearance of said user interface depending upon which secondary devices are in physical proximity to said remote control device.

* * * * *